(12) United States Patent
Jelinek

(10) Patent No.: US 7,535,496 B2
(45) Date of Patent: May 19, 2009

(54) AUDIO-BASED ATTENTION GRABBER FOR IMAGING DEVICES

(75) Inventor: Lenka M. Jelinek, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 10/060,748

(22) Filed: Jan. 30, 2002

(65) Prior Publication Data

US 2003/0142216 A1    Jul. 31, 2003

(51) Int. Cl.
  *H04N 5/76*    (2006.01)
  *G03B 17/00*   (2006.01)
  *G06K 9/46*    (2006.01)
  *G06K 9/66*    (2006.01)

(52) U.S. Cl. ............... 348/231.4; 396/264; 382/190

(58) Field of Classification Search ............ 348/207.99, 348/207.1, 211.3, 222.1, 231.4, 333.05, 333.11, 348/372, 333.1; 396/6, 544, 264
See application file for complete search history.

(56) References Cited

U.S. PATENT DOCUMENTS

| | | | |
|---|---|---|---|
| 4,072,973 A * | 2/1978 | Mayo | 396/544 |
| 4,827,348 A * | 5/1989 | Ernest et al. | 348/221.1 |
| 5,034,804 A * | 7/1991 | Sasaki et al. | 348/231.4 |
| 5,359,374 A * | 10/1994 | Schwartz | 40/455 |
| 5,508,774 A * | 4/1996 | Klees | 396/1 |
| 5,552,850 A * | 9/1996 | Matsumoto | 396/544 |
| 5,822,621 A * | 10/1998 | Szajewski | 396/6 |
| 6,067,116 A * | 5/2000 | Yamano et al. | 348/372 |
| 6,128,037 A * | 10/2000 | Anderson | 348/231.4 |
| 6,337,951 B1 | 1/2002 | Nakamura | |
| 6,683,649 B1 * | 1/2004 | Anderson | 348/333.05 |
| 6,750,902 B1 * | 6/2004 | Steinberg et al. | 348/211.3 |
| 6,853,403 B1 * | 2/2005 | Inoue et al. | 348/333.11 |
| 7,111,317 B1 * | 9/2006 | McIntyre et al. | 725/105 |
| 2004/0201738 A1 * | 10/2004 | Moores et al. | 348/231.2 |

FOREIGN PATENT DOCUMENTS

| | | |
|---|---|---|
| FR | 2 739 198 | 3/1997 |
| GB | 2 305 508 | 4/1997 |
| GB | 2 312 050 | 10/1997 |
| GB | 2 357 648 | 6/2001 |
| JP | 7-140536 | 6/1995 |
| JP | 9-163205 | 6/1997 |

(Continued)

OTHER PUBLICATIONS

Japanese Patent Office, Japanese Office Action for corresponding Application No. 2003-565163, 8 pages, Jul. 15, 2008.

*Primary Examiner*—David L Ometz
*Assistant Examiner*—Kelly L Jerabek
(74) *Attorney, Agent, or Firm*—Trop, Pruner & Hu, P.C.

(57) ABSTRACT

A digital imaging device such as a digital camera or a video camera may include the capability to store audio files. These audio files may be generated under user control when the user wishes to take a picture or capture video. The audio files may be played back as attention grabbers to attract the attention of the imaging subjects. After attracting the attention of the subjects by playing back a recorded audio sound, an image may be automatically captured.

18 Claims, 2 Drawing Sheets

FOREIGN PATENT DOCUMENTS

| | | |
|---|---|---|
| JP | 3051537 | 6/1998 |
| JP | 10-274802 | 10/1998 |
| JP | 3061973 | 6/1999 |
| JP | 2000-341569 | 12/2000 |
| JP | 2001-142131 | 5/2001 |
| JP | 2001-186393 | 7/2001 |
| JP | 2001-257911 | 9/2001 |

\* cited by examiner

AUDIO-BASED ATTENTION GRABBER FOR IMAGING DEVICES

BACKGROUND

This invention relates generally to imaging devices including still and video cameras.

When taking pictures of humans or animals, it is desirable to attract the attention of the photographic subjects. Sometimes if the subjects do not look at the imaging device, the resulting images may be less desirable. In addition, it is often desirable to induce the photographic subjects to smile right before the picture is taken. Thus, many photographers ask the subject to say "cheese" right before they take the picture. This causes the subjects to appear to be smiling and directs their attention towards the camera to produce a more pleasing picture.

While existing techniques work well, there is a need for more innovative ways to attract the attention of photographic subjects.

DETAILED DESCRIPTION

Figure 1:
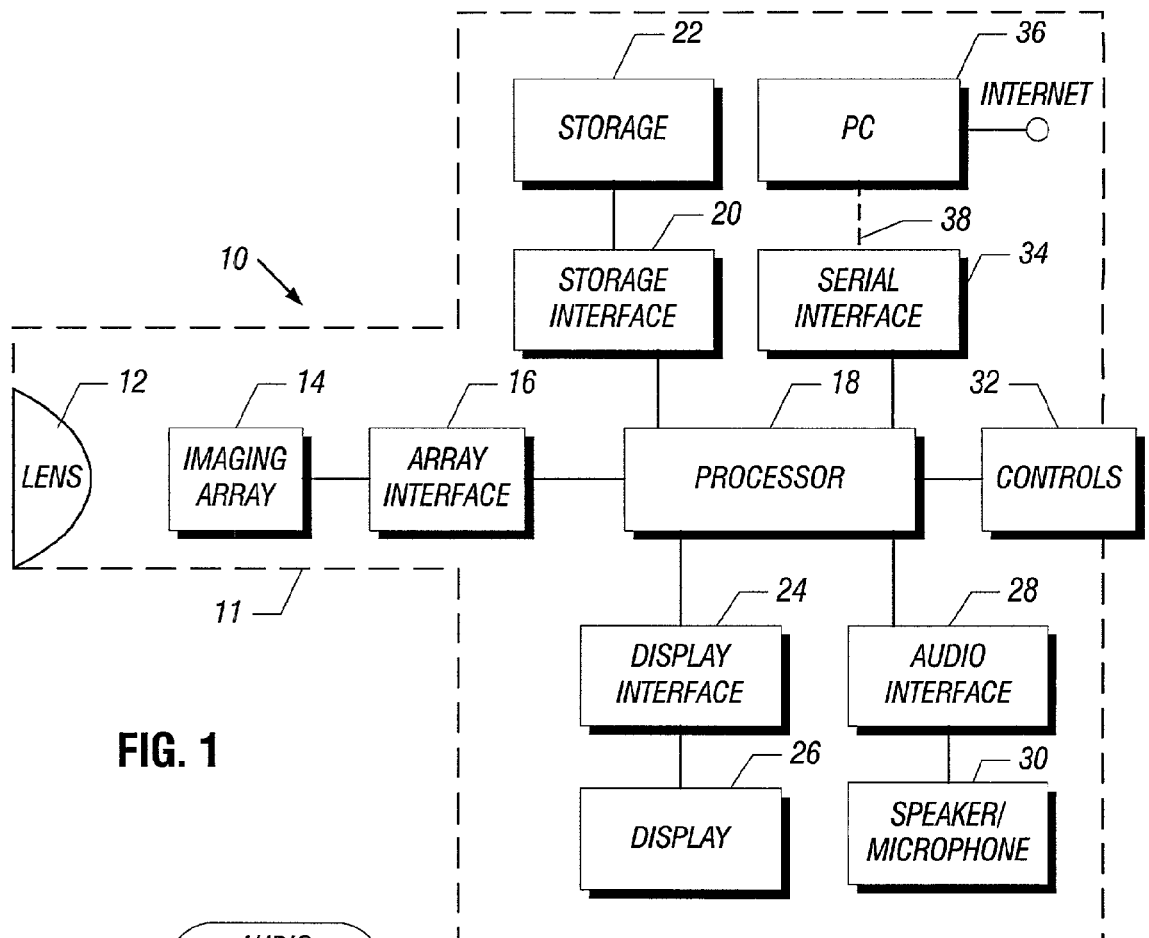
FIG. 1 is a schematic depiction of one embodiment of the present invention.

Referring to FIG. 1, a digital imaging device 10 may be a still camera or a moving picture or video camera, as a few examples. The imaging device 10 may include optics, such as a lens 12, that provide an image to an imaging array 14. The imaging array 14 may be a charge-coupled device (CCD) or complementary metal oxide semiconductor (CMOS) imaging array, as two examples. The image captured by the array 14 may be transferred to an array interface 16 for further processing. In some embodiments, the array interface 16 may provide pixel interpolation for missing color components. The interface 16 may also convert the captured image pixels into digital signals and adjust the colors for ultimate display.

The array interface 16 is coupled to a processor 18. The processor 18 may control the operation of the various components of the device 10 and may also provide an image processing function. The processor 18 may be controlled by a plurality of manual, user operable controls 32 that may be provided on the housing 11 of the imaging device 10.

The processor 18 is coupled to a storage interface 20 coupled in turn to a storage device 22. The storage device 22 may, in one embodiment, be a flash memory.

The processor 18 is also coupled to a serial interface 34 in one embodiment. The serial interface 34 may be coupled by a wireless or wired link 38 to a personal computer 36. The personal computer 36 may provide additional processing for images captured by the imaging device 10 and may provide application software for organizing, manipulating, editing, transferring, and using captured images. In addition, the personal computer 36 may be coupled to the Internet, as indicated, in some embodiments.

The processor 18 is also coupled to a display interface 24 that couples to a display 26. The display 26 may be a liquid crystal display (LCD) on the housing 11 of the imaging device 10 in some embodiments.

Finally, the processor 18 is also coupled to an audio interface 28. The audio interface 28 is in turn coupled to a speaker/microphone 30 that may be secured on the housing of the imaging device 10. The speaker provides audio outputs and the microphone receives audio inputs. The received audio signals may be converted into a digital form for processing and storage on the processor 18.

In some embodiments, a user may record sounds through the speaker/microphone 30 for subsequent playback before or after capturing an image. In particular, the user may play back attention grabbing sounds that may have been recorded in the storage 22. Such sounds may include a person saying the word "cheese," the rattle of a baby rattle to attract the attention of a baby, an animal's name to attract the attention of the animal, or any of a variety of other potentially attention grabbing sounds. The sounds may be recorded by the user or may be pre-recorded and stored within the imaging device 10 in the storage 22.

In some cases, the processor 18 may electronically alter the recorded sounds for amusing effects. In addition, the processor 18 may time the generation of the sounds to coordinate with image capture in some embodiments. Also, a catalog of sounds may be accessed over the Internet, for example through the personal computer 36. The Internet acquired sound files may be downloaded through the link 38 and the serial interface 34 to the imaging device 10. As still another option, users may create their own sound files on a personal computer, for example, and transfer those files to a camera, via a wired or wireless link or using a portable storage medium.

Figure 2:
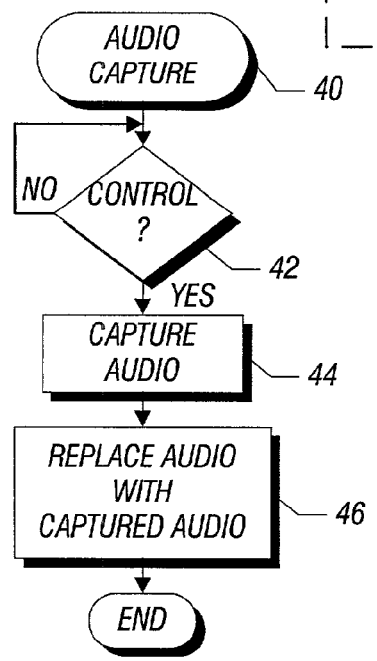
FIG. 2 is a flow chart for software in accordance with one embodiment of the present invention.

The audio capture software 40, shown in FIG. 2, may be stored on the storage 22 in accordance with one embodiment of the present invention. When an appropriate control signal is received, for example from the controls 32, as determined at diamond 42, an audio signal may be captured through the speaker/microphone 30. In some embodiments, the captured audio may replace audio previously stored on the storage 22. In other embodiments, a plurality of audio segments may be stored for selection and play back on demand. In other words, a plurality of different sounds may be generated, as desired, under user control using the controls 32.

As still another embodiment, audio may be captured automatically in association with image capture. In one embodiment, image recognition software may identify an attribute of the captured image and may select and store an appropriate sound given the nature of the captured image.

Figure 3:
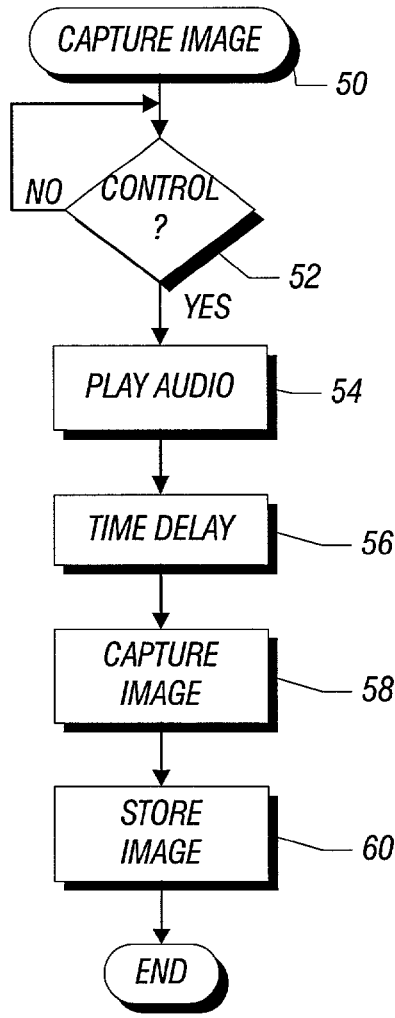
FIG. 3 is a flow chart for software in accordance with one embodiment of the present invention.

Referring next to FIG. 3, the image capture software 50 may also be stored on the storage 22 in some embodiments. When an appropriate user operable control is operated, such as one of the controls 32, as determined in diamond 52, an audio sound is automatically played back as indicated in block 54. This audio sound may be a pre-stored audio sound that that may have been recorded through the speaker/microphone 30, downloaded over the Internet, created by the user or provided with the imaging device 10 as described previously. After the audio is played back, a time delay may be invoked, as indicated in block 56. The time delay may be appropriate to allow the photographic subjects to react to the audio prompt.

After the time delay, the image capture may be automatically implemented, as indicated in block 58. This image capture may be automatically accompanied by a flash in some cases. Finally, the captured image may be stored, as indicated in block 60, for example, in the storage 22. Alternatively, the image may be transferred to the personal computer 36. In one embodiment, the captured sound file is linked with the captured image file for transfer to the personal computer.

Figure 4:
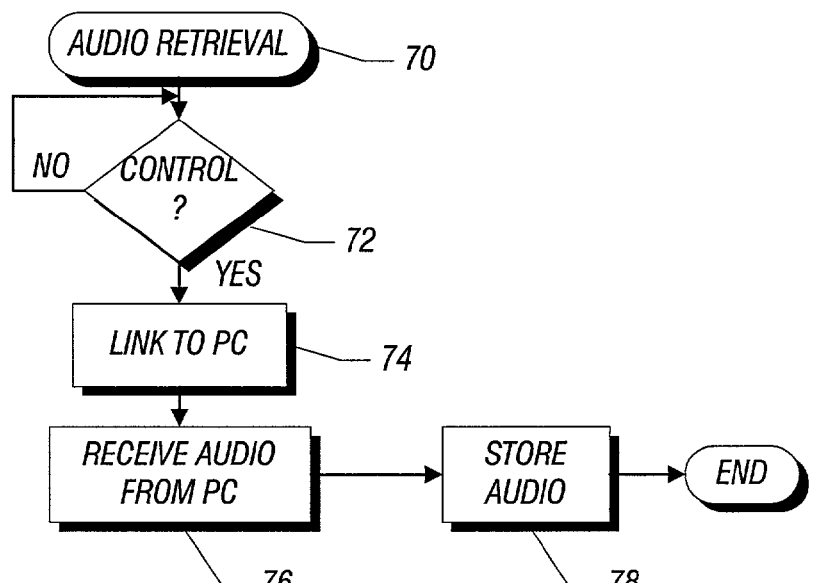
FIG. 4 is a flow chart for software for one embodiment of the present invention.

Referring to FIG. 4, in an embodiment in which audio sounds may be retrieved over the Internet, the audio retrieval software 70 may be stored on the storage 22. When an appropriate control signal is received, again for example through the controls 32, a check at diamond 72 automatically links the imaging device 10 to the personal computer 36, as indicated in block 74. An audio file may be received from the personal computer 36 over the link 38, as indicated in block 76. That file may be downloaded from the Internet or may have been derived from a storage device on the personal computer 36, such as a compact disk, as one example. The downloaded audio file may then be stored, for example, in the storage 22, as indicated in block 78. In other embodiments, the imaging device 10 may itself directly link to the Internet.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An imaging device comprising:
   an imaging array;
   a processor housed within said imaging device and coupled to said imaging array; and
   a storage storing instructions that enable the processor to store more than one audio segment in the storage at the same time and to enable selection of one of said more than one audio segments to play back, to sequentially play back the selected audio segment and then after a time delay after playing back the audio segment and without further user input after playing back audio segment, automatically capture an image;
   said imaging device to use image recognition software to identify an attribute of a captured image and to select and store a sound based on the attribute of the captured image.

2. The imaging device of claim 1 wherein said imaging device is a digital camera.

3. The imaging device of claim 1 wherein said imaging device is a video recorder.

4. The imaging device of claim 1 including a control which allows a user to initiate the capture of an image.

5. The imaging device of claim 1 including a microphone, said storage storing instructions that enable sounds to be recorded.

6. The imaging device of claim 5 wherein the processor is enabled to electrically alter a recorded sound to affect the amusement of said recorded sound.

7. The imaging device of claim 1 including a speaker.

8. The imaging device of claim 1 wherein the processor is enabled to receive audio files from the Internet.

9. The imaging device of claim 1 wherein the processor is enabled to receive sound files created on a separate processor-based system.

10. The imaging device of claim 1 wherein the storage stores instructions that enable the processor to capture audio automatically in association with said image capture.

11. The imaging device of claim 10 wherein the storage stores instructions that enable the processor to link the captured audio with the captured image.

12. An imaging device comprising:
    an imaging array;
    a processor coupled to said imaging array;
    a storage storing instructions that enable the processor to automatically play back audio, provide a time delay and to automatically capture an image; and
    said imaging device storage storing instrntctions to use image recognition software to identify an attribute of a captured image and to select and store a sound based on the attribute of the captured image.

13. The imaging device of claim 12 wherein said imaging device is a digital camera.

14. The imaging device of claim 12 wherein said imaging device is a video recorder.

15. The imaging device of claim 12 including a control which allows a user to initiate the capture of an image.

16. The imaging device of claim 12 including a microphone, said storage storing instructions that enable sounds to be recorded.

17. The imaging device of claim 12 including a speaker.

18. The imaging device of claim 17 wherein the processor is enabled to electrically alter a recorded sound to affect the amusement of said recorded sound.

\* \* \* \* \*